United States Patent
Brown

(10) Patent No.: US 10,946,288 B1
(45) Date of Patent: Mar. 16, 2021

(54) MUSICAL GAMING DEVICE

(71) Applicant: Catherine Brown, Pt Charlotte, FL (US)

(72) Inventor: Catherine Brown, Pt Charlotte, FL (US)

(*) Notice: Subject to any disclaimer, the term of this patent is extended or adjusted under 35 U.S.C. 154(b) by 12 days.

(21) Appl. No.: 16/421,790

(22) Filed: May 24, 2019

(51) Int. Cl.
*A63F 13/00* (2014.01)
*A63F 13/814* (2014.01)
*H04R 1/02* (2006.01)
*G10H 1/00* (2006.01)
*G10H 1/34* (2006.01)
*A63F 13/285* (2014.01)
*A63F 13/23* (2014.01)
*A63F 13/24* (2014.01)

(52) U.S. Cl.
CPC .......... *A63F 13/814* (2014.09); *A63F 13/23* (2014.09); *A63F 13/24* (2014.09); *A63F 13/285* (2014.09); *G10H 1/0008* (2013.01); *G10H 1/34* (2013.01); *H04R 1/025* (2013.01); *A63F 2300/1025* (2013.01); *A63F 2300/1037* (2013.01); *A63F 2300/1043* (2013.01); *A63F 2300/8047* (2013.01); *G10H 2220/151* (2013.01); *H04R 2499/11* (2013.01)

(58) Field of Classification Search
CPC .................. A63F 13/814; A63F 2300/8047
See application file for complete search history.

(56) References Cited

U.S. PATENT DOCUMENTS

| | | |
|---|---|---|
| 483,818 A | 10/1892 | Strong |
| 4,718,876 A | 1/1988 | Lee |
| 5,471,192 A | 11/1995 | Dash |
| 6,238,263 B1 | 5/2001 | Bennett |
| 8,008,563 B1 | 8/2011 | Hastings |
| 8,088,003 B1 | 1/2012 | Bickerton et al. |
| 2001/0051541 A1* | 12/2001 | Matsuura ............ A63F 13/10 463/31 |
| 2004/0137984 A1* | 7/2004 | Salter ................ A63F 13/44 463/35 |
| 2015/0370226 A1* | 12/2015 | Kim ................ G05B 13/0205 700/49 |

* cited by examiner

*Primary Examiner* — David L Lewis
*Assistant Examiner* — Eric M Thomas
(74) *Attorney, Agent, or Firm* — Sanchelima & Associates, P.A.; Christian Sanchelima; Alexander J. Rodriguez

(57) ABSTRACT

A musical gaming device is disclosed. The musical gaming device serves to distract a user while they are under stressful situations or when they are idle. The gaming device engages a user in multiple ways in order to achieve a calming effect on a user. The musical gaming device may produce musical notes or sounds along with vibrations which a user is to replicate. The sounds and vibrations are replicated through buttons found on the musical gaming device. If a user is unable to replicate the specific sequence corresponding to one or more input musical notes then the game ends. The calming effect occurs both through the sounds heard and the vibrations produced. Thereby helping a user get through a stressful situation.

12 Claims, 4 Drawing Sheets

MUSICAL GAMING DEVICE

BACKGROUND OF THE INVENTION

1. Field of the Invention

The present disclosure relates to a musical gaming device. More particularly, the present disclosure relates to musical gaming device that calms a user by engaging the user in an activity, such as allowing them to play a musical game.

2. Description of the Related Art

Children or adults often feel anxiety or fear during certain situations. It becomes important for them to get involved in some activity instead of sitting idle to overcome the anxiety and thus, calm down. For example, in certain situations, such as during medical or dental checkups in a clinic, children or adults may feel anxious and/or scared, and parents or doctors may try to calm them down using some sort of distractive activity. In other situations, people at bus stands, airports, or in other public places may also feel anxious while waiting for long periods of time, which may result in people using social media, or reading newspapers to spend their idle time. However, social media or newspapers do not catch the interest sufficiently as there is no specific task to complete. Further, social media is not a healthy platform for children. Also, the usage of social media does not have any calming effect. Several designs for various devices, such as toys or games, have been designed in the past. None of them, however, includes a calming musical toy or game.

Applicant believes that a related reference corresponds to U.S. Pat. No. 6,238,263 issued to Richard Bennett that discloses a toy for soothing, distracting and captivating a child comprising a hand-held figure which vibrates, lights up and produces sounds. U.S. Pat. No. 5,471,192 issued to Glen Dash that discloses a plush toy animal which produces a sound when touched. U.S. Pat. No. 8,088,003 issued to Matthew James Bickerton et. al that discloses a visual, auditory, and tactile prompting game wherein a person responds to visual, auditory and tactile prompts to follow a pattern on the toy. U.S. Pat. No. 4,718,876 issued to Min J. Lee that discloses a child calming toy with rhythmic vibrations. U.S. Pat. No. 8,008,563 issued to Karla Kay Hastings that discloses an interactive educational musical instrument wherein the keys on the instrument will illuminate or vibrate to prompt the person to press the desired key to produce the desired musical note. U.S. Design Pat. Des. 483,818 issued to that illustrates an ornamental design for an interactive stuffed toy. Lastly, Foreign Patent Document WO1999059131A1 issued to OREN-CHAZON, Dorly that discloses a music producing educational toy.

However, the above references differ from the present invention because the present invention discloses a musical gaming device that calms a user by engaging the user in an activity, such as allowing user to play a musical game. The calming effects result from the game serving as a distraction and further from the vibrations felt while playing the game of the present invention.

Other documents describing the closest subject matter provide for a number of more or less complicated features that fail to solve the problem in an efficient and economical way. None of these patents suggest the novel features of the present invention.

SUMMARY OF THE INVENTION

It is an object of present invention to provide a musical gaming device with buttons. The musical gaming device may further comprise vibration motors therein. The vibration motors may be configured to produce vibrations corresponding to one or more input musical notes which occur with the button presses. This game along with the vibrations produced by the musical gaming device help soothe or calm a user through distraction.

It is another object of the present invention to produce musical notes or sounds which further distract a user or engage a user in distracting activities from stressful situations.

It is still another object of the present invention to be simple to use as it is to be used by anyone as young as a child.

It is yet another object of the present invention to be inexpensive to manufacture.

Further objects of invention will be brought out in following part of specification, wherein detailed description is for purpose of fully disclosing invention without placing any limitations thereon.

BRIEF DESCRIPTION OF DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
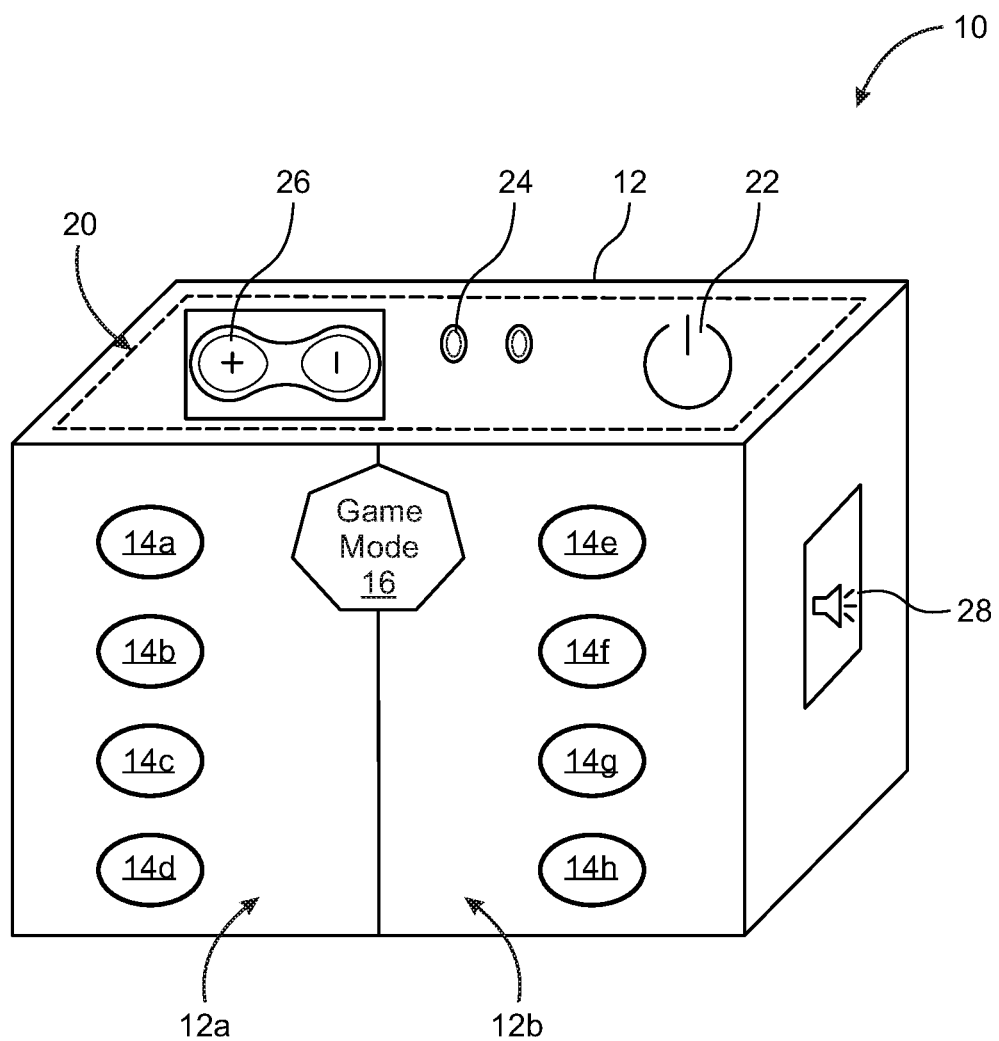
FIG. 1 illustrate the musical gaming device 10 of the present invention, according to an embodiment described herein.

Referring now to the drawings, FIG. 1 to FIG. 3, where the present invention is generally referred to with numeral 10, it can be observed that a musical gaming device, in accordance with one embodiment, is provided that includes various components, as described hereinafter.

Figure 1A:
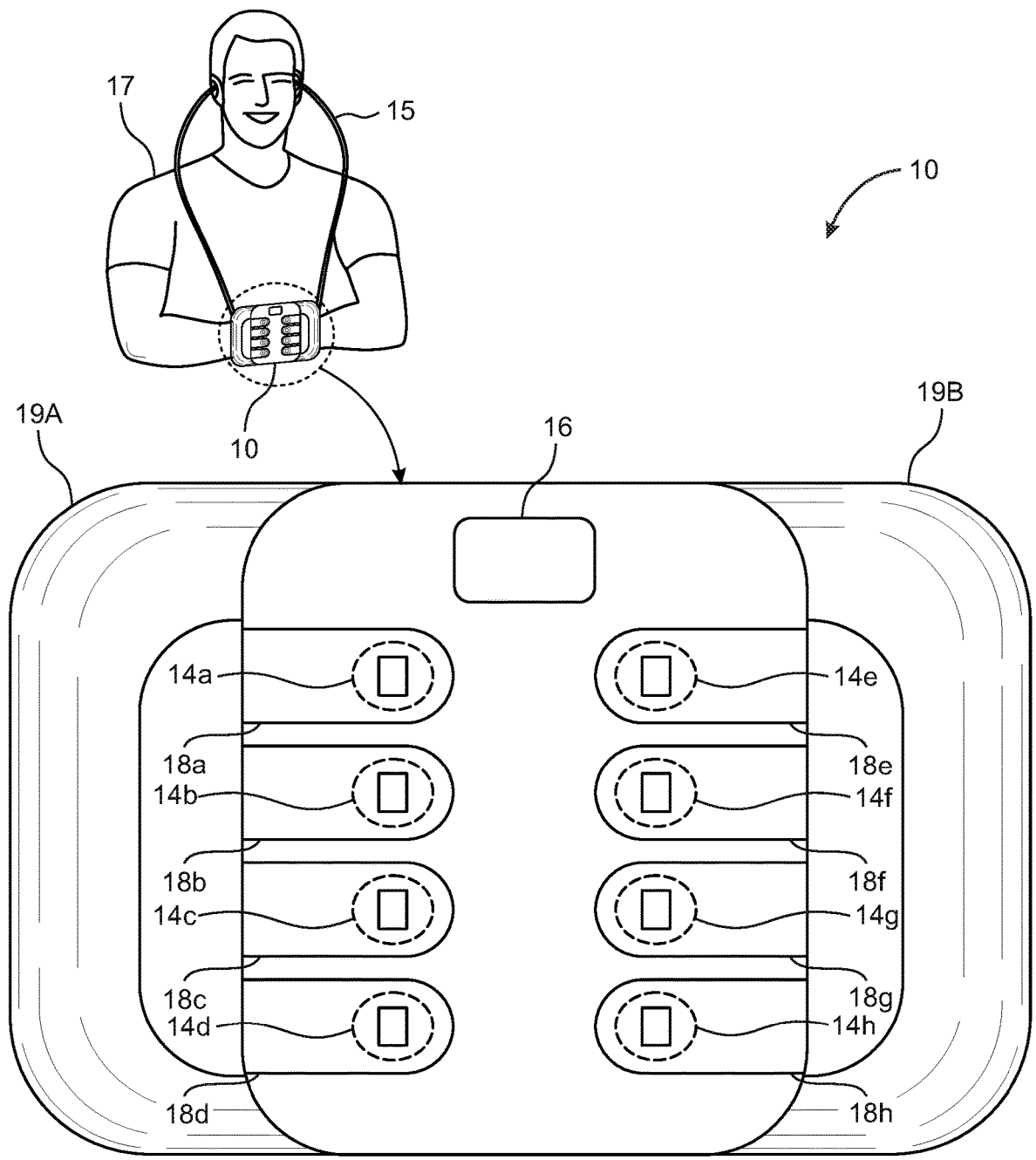
FIG. 1A illustrate the musical gaming device 10 of the present invention, according to an embodiment described herein.

FIGS. 1 and 1A represent the musical gaming device 10 of the present invention, according to various embodiments described herein. As illustrated, musical gaming device 10 may comprise a body 12. The body 12 may include a first side 12a and a second side 12b. In some example embodiments, first side 12a and second side 12b of body 12 may comprise buttons 14a-14h. There is further shown a button indicated as game mode 16 that may be manipulated by a user to change through various musical game modes. Game mode 16 may correspond to one of an easy mode, a medium mode, or a difficult mode. In an embodiment, difficult mode may comprise longer musical notes than musical notes of easy mode and medium mode. Obviously, easy mode may comprise shorter musical notes than musical notes of difficult mode and medium mode, and medium mode may comprise intermediate musical notes than musical notes of easy mode and difficult mode. In an embodiment, game mode 16 may terminate upon pressing a wrong button corresponding to a vibration produced by vibration motors, as described below. It should be understood that in alternate embodiments the number of buttons may be more or less than what is immediately shown.

Figure 2:
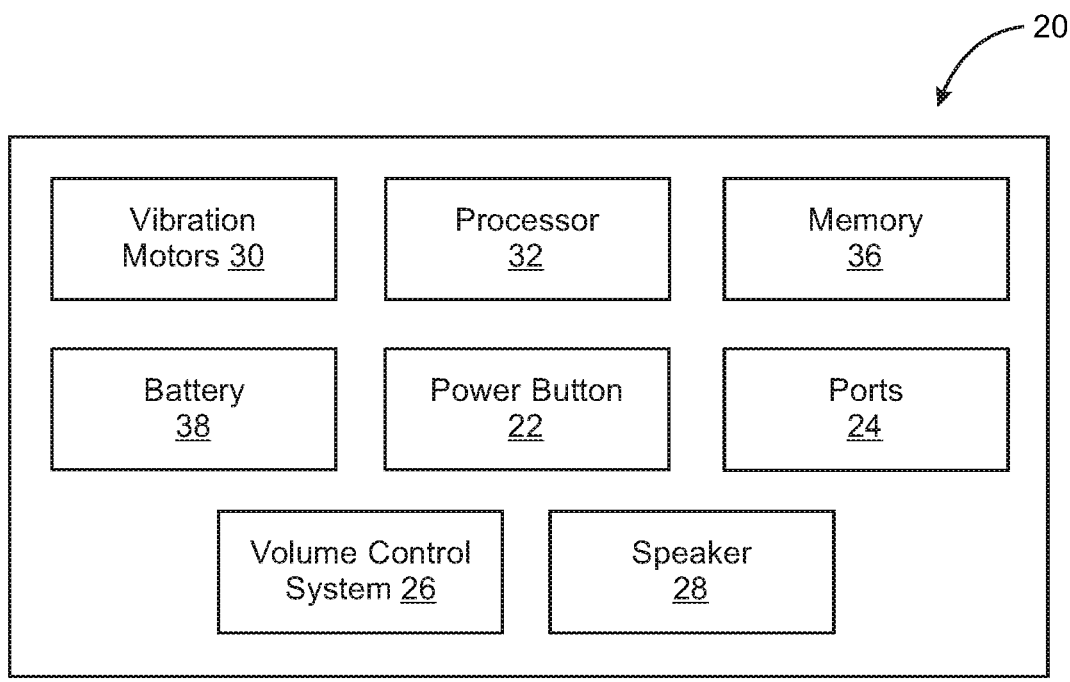
FIG. 2 represents internal and external components of circuitry 20 of exemplary musical gaming device 10 of present invention, according to various embodiments described herein.

Further illustrated in FIG. 1 is a circuitry 20 which is described in FIG. 2 in detail. Circuitry 20 may include internal and external components. External components, such as a power button 22, ports 24, a volume control system 26, and a speaker 28, may be directly manipulated by user as they are provided on body 12 of musical gaming device 10. The ports 24 are adapted to receive headphones to allow to listen to the musical notes produced by the game privately. Internal components, as illustrated in FIG. 2, such as vibration motors 30, processor 32, memory 36, and battery 38, may be not be directly manipulated by user as they are provided inside body 12 of musical gaming device 10 to operate or control musical gaming device 10. All such internal and external components are described in detail in FIG. 2.

As illustrated in FIG. 1A, a first set of buttons 14a-14d on first side 12a may correspond to right-hand fingers 18a-18d of a user, such as patient 17, and second set of buttons 14e-14h on second side 12b may correspond to left-hand fingers 18e-18h of user. Size and position of the first set of buttons 14a-14d and the second set of buttons 14e-14h may be such that a user can comfortably hold musical gaming device 10 with both hands. In accordance with an embodiment, musical gaming device 10, may include handles 19A and 19B towards the sides so that a user such as patient 17, can securely and safely hold musical gaming device 10 with both hands. Accordingly, right-hand fingers 18a-18d must be suitably placed over first set of buttons 14a-14d and left-hand fingers 18e-18h must be suitably placed over second set of buttons 14e-14 when a user holds musical gaming device 10. In such an orientation, vibration in one or more of first set of buttons 14a-14d may be felt by one or more of right-hand fingers 18a-18d, and vibration in one or more of second set of buttons 14e-14f may be felt by one or more of left-hand fingers 18e-18h.

In an embodiment, musical gaming device 10 may be in form of a soft toy with rounded edges that a user, such as patient 17, may rest on his chest or stomach. The user such as patient 17, may be plugged into the musical gaming device 10 with earphones 15 connected to ports 24. The musical gaming device can be in the form of a plush toy or any other suitable material. In an example embodiment, height of musical gaming device 10 may be 6-8", length may be 8" and width may be 2". Types of material used may be cleanable vinyl or rubber or any soft material that would comfortable to a user as body 12. In an embodiment, musical gaming device 10 may have Bluetooth functionality for wirelessly connecting with earphones.

Power button 22 may be buttons that may be configured to switch ON or OFF musical gaming device 10.

Ports 24 may correspond to hardware interfaces that may be utilized to connect one or more external units with musical gaming device 10. External unit may include a headphone or an earphone. In some example embodiments, ports 24 may correspond to one or more USB ports. Such USB ports may provide support to all USB devices, such as cell phones and battery chargers.

Volume control system 26 may include buttons to control volume of one or more output musical notes rendered by speaker 28.

Speaker 28 may be configured to generate one or more output musical notes in response to pressing of buttons 14a-14h in specific sequences. One or more output musical notes that may be generated, may correspond to one or more user inputs upon pressing of buttons 14a-14h based on a successful match between one or more user inputs and vibrations in buttons 14a-14h in specific sequences.

Vibration motors 30 may be configured to produce a vibration in each of buttons 14a-14h in a specific sequence corresponding to one or more input musical notes. In some example embodiments, an input musical note may be a note corresponding to any song or any random musical note. Vibration motors 30 may be mounted below each of buttons 14a-14h. In some example embodiments, vibration in each of buttons 14a-14h produced by vibration motors 30 may be felt by corresponding fingers of a user when the user places his/her fingers on the respective buttons 14a-14h. In some example embodiments, buttons 14a-14h are provided for all fingers except thumbs. Exemplary musical gaming device 10 illustrated herein comprises eight buttons, but the present invention is not strictly limited to eight buttons. Any other number of buttons in alternate embodiments may be suitable. Vibrations in each of buttons 14a-14h may be identical and duration depends on selected game mode 16. Vibrations in each of buttons 14a-14h may be different in duration and also in intensity.

In response to the vibrations produced by the vibration motors 30 of musical gaming device 10, user replicates the vibrations and presses the corresponding button of buttons 14a-14h. Vibrations may be produced at a single button at a time or multi vibrations may be produced at the same time. User has to replicate a single vibration or multi vibrations with corresponding fingers. In some example embodiments, speaker 28 of musical gaming device 10 may generate one or more output musical notes in response to pressing of buttons 14a-14h in a specific sequence. For example, vibration is produced corresponding to buttons 14a, 14e, and 14b, and buttons 14a, 14e, and 14b are pressed with fingers 18a, 18e, and 18b in the same sequence. In such case, one or more output musical notes are generated that replicate one or more input musical notes. In some example embodiments, the selected game mode 16 may terminate upon pressing a wrong button corresponding to the produced vibrations. For example, a vibration is produced corresponding to button 14a, but button 14e is pressed with finger 18e. In such case, the selected game mode 16 terminates. The game is lost at this point and the user can decide to start a game mode again.

Processor 32 may include a processing unit that may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a coprocessor, and/or other processors or integrated circuits. In some example embodiments, processor 32 may be configured to control game mode 16 and vibration motors 30 in accordance with one or more input musical notes. In some example embodiments, processor 32 may be configured to determine one or more input musical notes based on a specific rhythm, tune or song retrieved from memory 36. In some example embodiments, processor 32 may be configured to activate vibrating motors 30 to produce vibrations in buttons 14a-14h in specific sequence based on one or more input musical notes. In some example embodiments, processor 32 may be configured to determine whether one or more user inputs provided on buttons 14a-14h match with corresponding vibrations produced in buttons 14a-14h in specific sequence. In some example embodiments, processor 32 may be configured to deactivate vibration motors 30 with an audio message based on an unsuccessful match one or more user input provided on buttons 14a-14h and corresponding vibrations produced in buttons 14a-14h in specific sequence.

Memory 36 may be configured to store one or more input musical notes corresponding to a musical song. Memory 36 may be configured to buffer at least music files and musical notes corresponding to a specific rhythm, tune or song. Such one or more input musical notes may be retrieved and determined by processor 32 to actuate the vibration motors 30 in specific sequence.

In some example embodiments, battery 38 may be used to power musical gaming device 10. Battery 38 may be a rechargeable battery that may receive power from one or more external power sources, such as battery power source or a solar power system. For example, battery 38 may be a Lithium-based battery pack.

Figure 3:
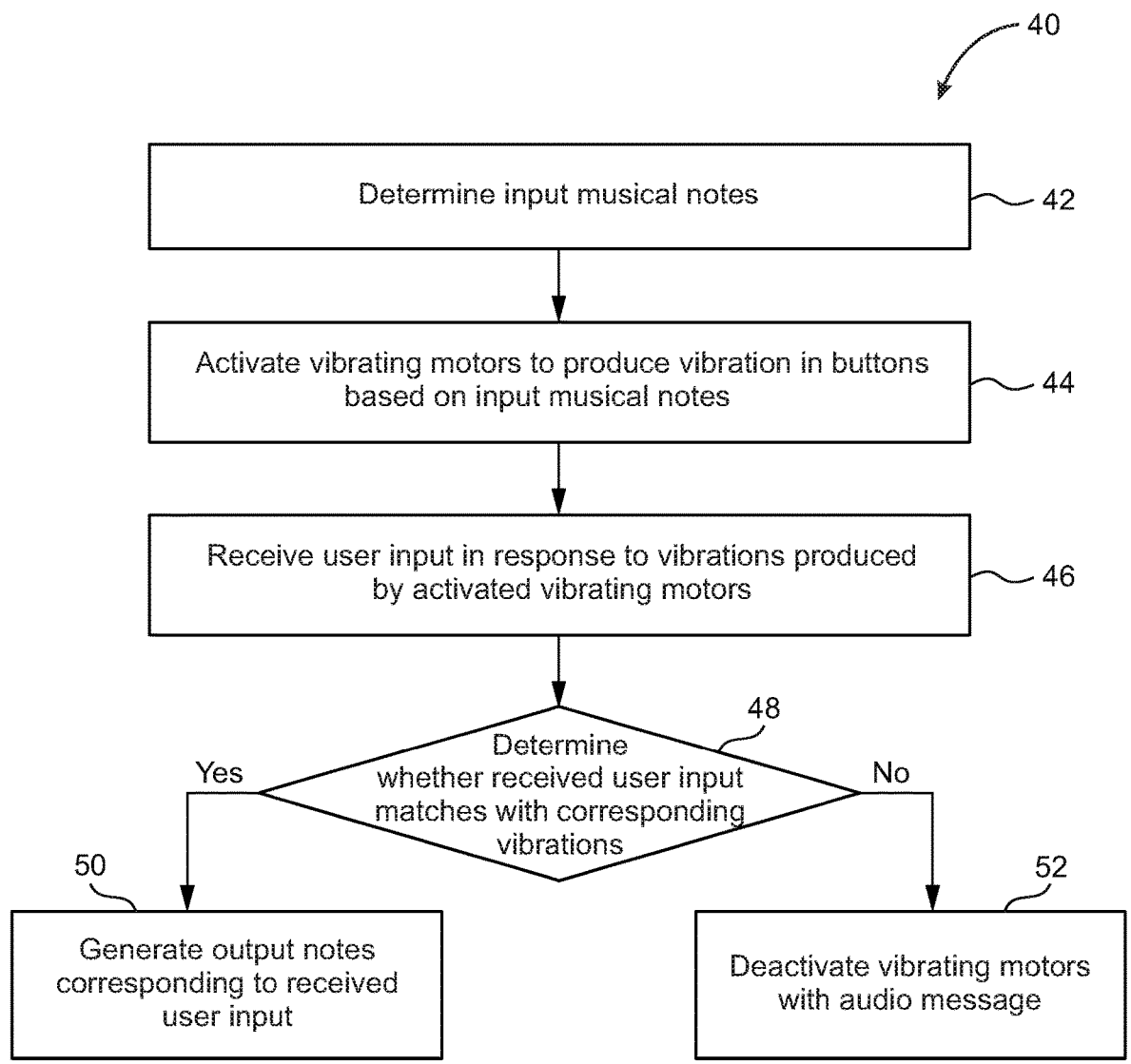
FIG. 3 represents method 40 for playing musical game using musical gaming device 10, according to various embodiments described herein.

FIG. 3 represents method 40 for playing musical game in a musical gaming device 10, according to various embodiments described herein.

At step 42, one or more input musical notes may be determined by processor 32 based on a specific rhythm, tune or song retrieved from memory 36.

At step 44, vibrating motors 30 may be activated by processor 32 to produce vibration in buttons 14a-14h in specific sequence based on one or more input musical notes.

At step 46, one or more user inputs may be received at buttons 14a-14h by corresponding fingers based on pressing of buttons 14a-14h in response to vibrations produced in buttons 14a-14h in a specific sequence based on one or more input musical notes.

At step 48, it may be determined by processor 32 whether one or more user input provided on buttons 14a-14h match with corresponding vibrations produced in buttons 14a-14h in the specific sequence.

At step 50, one or more output musical notes may be generated by speaker 28 corresponding to one or more user input based on a successful match between one or more user input and vibrations in buttons 14a-14h in specific sequence. Thereby meaning the game continues for at least another round or until the user makes incorrect inputs.

At step 52, vibration motors 30 may be deactivated by processor 32 with an audio message based on an unsuccessful match of one or more user inputs provided on buttons 14a-14h and corresponding vibrations produced in buttons 14a-14h in specific sequence. For example, if a user has pressed a wrong button then vibrating motors 30 may be deactivated with an audio message, such as 'game over', or 'try again'.

Proposed musical gaming device 10 may provide a gaming platform along with calming children or adults during stressful, such as getting a procedure done at a dental clinic. For example, musical gaming device 10 may calm a child or an adult by involving them in an activity using their hands to play a game on musical gaming device 10 while they are getting their teeth cleaned, drilled or extracted without even looking at it.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made without departing from the principles and concepts set forth herein.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A musical gaming device, comprising:
a body that includes a first side and a second side, wherein each of said first side and said second side of said body comprises buttons further defined as a first set of buttons and a second set of buttons;
vibration motors mounted below each of buttons, wherein said vibration motors are configured to produce vibrations in said buttons in a specific sequence corresponding to one or more input musical notes;
a speaker configured to output one or more output musical notes in response to pressing said buttons in said specific sequence;
a processor configured to control said vibration motors based on the selected game mode in accordance with said one or more input musical notes;
a memory configured to store said one or more input musical notes corresponding to a musical song, rhyme, tune;
a battery configured to power said musical gaming device, wherein said battery receives power from one or more external power sources; and
ports configured to provide interfaces to one or more external units connected with said musical gaming device.

2. The musical gaming device of claim 1, wherein a first set of buttons of said buttons placed towards said first side corresponds to right-hand fingers of a user, wherein said vibration in one or more of said first set of buttons is felt by one or more of said right-hand fingers of said user.

3. The musical gaming device of claim 1, wherein a second set of buttons of said buttons placed towards said second side corresponds to left-hand fingers of a user, wherein said vibration in one or more of said second set of buttons is felt by one or more of said left-hand fingers of said user.

4. The musical gaming device of claim 1, wherein said vibration in said each of said buttons is identical.

5. The musical gaming device of claim 1, further comprises a power button to switch ON and switch OFF said musical gaming device.

6. The musical gaming device of claim 1, wherein said vibration in said each of said buttons are of various length or intensity.

7. The musical gaming device of claim 1, wherein said game mode corresponds to one of an easy mode, a medium mode, or a difficult mode.

8. The musical gaming device claim 7, wherein said difficult mode comprises longer musical notes than musical notes of said easy mode and said medium mode.

9. The musical gaming device of claim 1, wherein said game mode terminates upon pressing a wrong button corresponding to said vibrations.

10. The musical gaming device of claim 1, wherein said one or more external units includes a headphone or an earphone.

11. The musical gaming device of claim 1, wherein said body is made of a plush material.

12. The musical gaming device of claim 1, further comprises a volume adjustment button configured to control volume of said one or more output musical notes.

* * * * *